No. 873,228.　　　　　　　　　　　　　　　PATENTED DEC. 10, 1907.
A. HAHN.
TELESCOPE.
APPLICATION FILED FEB. 9, 1907.

3 SHEETS—SHEET 1.

Witnesses:
L. E. Barkley.
L. A. Sands.

Inventor:
Arwed Hahn,
by Francis A. Appleman
Atty.

No. 873,228. PATENTED DEC. 10, 1907.
A. HAHN.
TELESCOPE.
APPLICATION FILED FEB. 9, 1907.

3 SHEETS—SHEET 2.

No. 873,228. PATENTED DEC. 10, 1907.
A. HAHN.
TELESCOPE.
APPLICATION FILED FEB. 9, 1907.

3 SHEETS—SHEET 3.

UNITED STATES PATENT OFFICE.

ARWED HAHN, OF CASSEL, GERMANY.

TELESCOPE.

No. 873,228.         Specification of Letters Patent.         Patented Dec. 10, 1907.

Application filed February 9, 1907. Serial No. 356,534.

*To all whom it may concern:*

Be it known that I, ARWED HAHN, a subject of the Emperor of Germany, and a resident at Wilhelmshöher Allee 25¾, Cassel, Germany, have invented a new and useful Improved Telescope, of which the following is a specification.

The present invention relates to a universal telescope which on account of its individual parts being suitably arranged and constructed is adapted for use as a telescope for goniometrical instruments of all kinds, for example, theodolites, leveling-instruments, compasses, and as a telescope for cannon, and so on. As compared with already-known instruments of the above-mentioned kinds, it possesses the advantage that the operation of looking for all objects situated within sight can proceed without the observer altering his position. Further the images of the scale divisions for enabling any angles in space to be read off continually remain in the field of view of the observer, any suitable method whatever being employed for erecting the inclined images. All the moving mechanism and the parts which serve for adjusting and setting the telescope are moreover arranged within the casing in such a way that it is quite impossible for them to be injured, which has hitherto frequently been the case with instruments which have thus been rendered unusable. Moreover the use of toothed wheels for transmitting motion which has hitherto been transmitted almost exclusively by such wheels is entirely avoided and consequently all the troubles which arise from the breaking off of the teeth when subjected to violent shocks are also entirely absent.

Several embodiments of the present invention are illustrated in the accompanying drawings, it being understood that the number of all possible constructions is not limited to those shown which are given merely by way of example.

Figure 1:
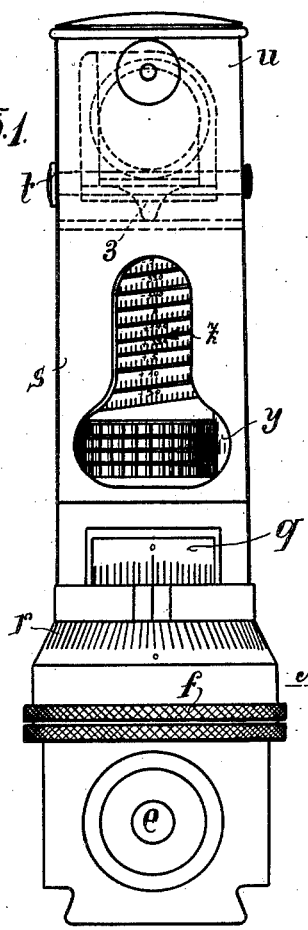
Figure 2:
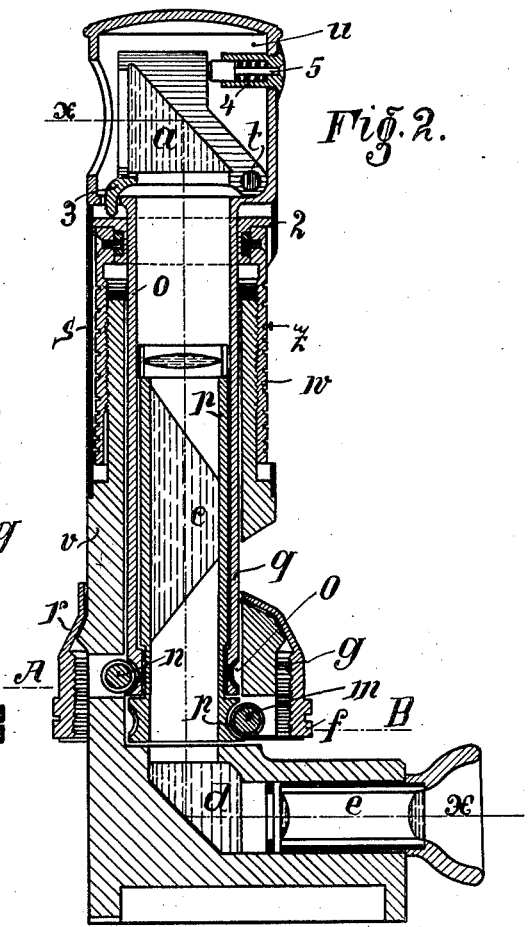
Figure 3:
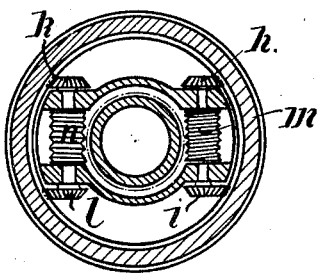
Figure 4:
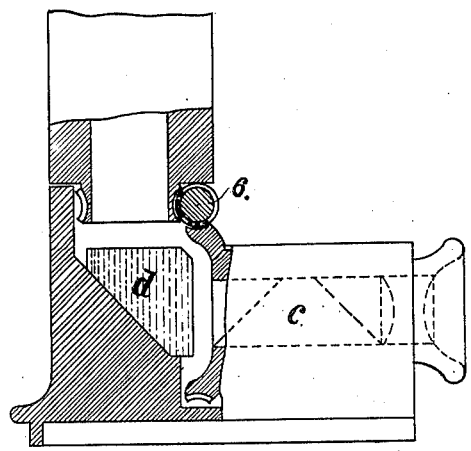
Figure 5:
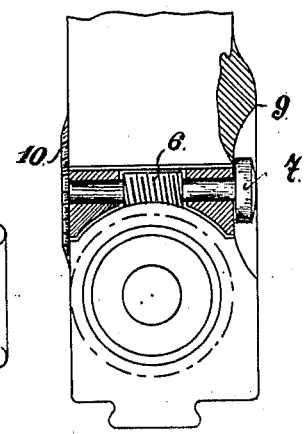
Figure 6:
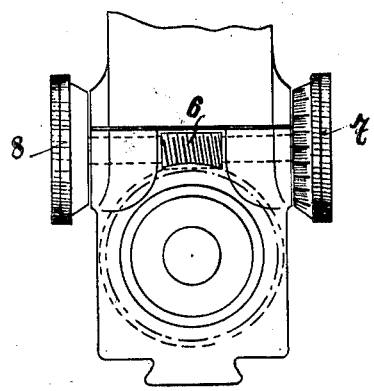
Figure 7:
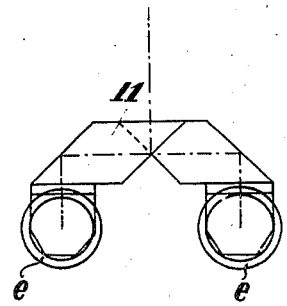
Figure 8:
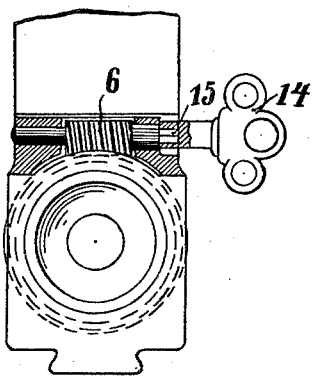
Figure 9:
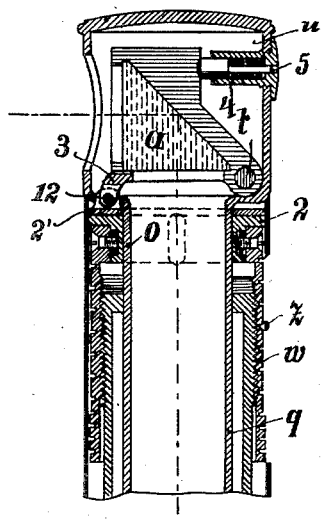
Figure 10:
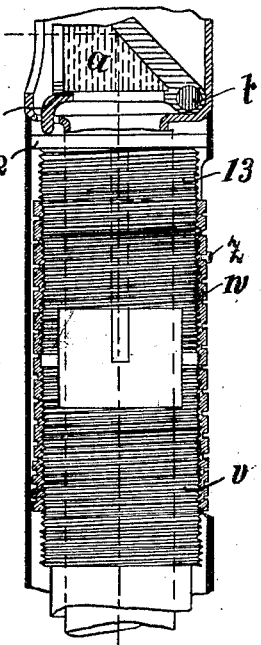

In such drawings:—Figure 1 is a front elevation, and Fig. 2 a longitudinal section through one embodiment, and Fig. 3 a cross-section on the line A—B of Fig. 2. Figs. 4—6 illustrate three other forms of the mechanism of the reflectors. Fig. 7 represents diagrammatically a modification of a detail Fig. 8 shows an alternative form of the mechanism illustrated in Fig. 5. Figs. 9 & 10 are longitudinal sections showing alternative forms of the mechanism for adjusting the receiving reflector $a$.

In Figs. 4, 5, 6, 8, 9, and 10 portions of the telescope are broken off.

The path of the rays of light is indicated by the line $x$—$x$ (see Fig. 2,) composed of dots and dashes. The rays emitted by the object are reflected through a right angle by means of the receiving reflector $a$ so that they pass through the object-glass $b$ and the prism $c$ into the prism $d$. Here the image if desired is reversed at a sloping surface and after being reflected at right angles passes through the eye-piece $e$ into the eye of the observer.

The particular arrangement of the individual optical parts is of course of no consequence. For example, the erecting reflector $c$ may be arranged behind the reflector $d$ without the general construction of the instrument being altered. Some of the figures of the accompanying drawings show forms in which this latter arrangement of the reflectors is adopted.

In the form shown in Fig. 1 the two reflectors $a$ and $c$ are moved in the following manner: On turning the milled edge of the sleeve $f$ the thread $g$ on the inner surface of said sleeve rotates the worm-wheels $h$, $i$, $k$, $l$ which on their part are connected with the endless screws $m$ and $n$. The endless screw $n$ engages with the sleeve $o$ rigidly connected with the receiving reflector $a$ and on rotating causes said reflector to rotate horizontally, while the movement of the prism $c$ serving to erect the image is effected by the rotation of the other screw $m$, which engages with its thread in the casing $p$ of the prism $c$ the velocity ratio having a suitable value. The horizontal angle-values may then be read off for example on the ring $q$ and the sloping surface $r$ of the milled sleeve $f$ or in any other suitable manner adapted for such instruments.

In order to enable the reflector $a$ to move in a vertical direction as well as in a horizontal plane a drum is provided with a helical groove, said drum being so arranged that it is situated below the receiving reflector $a$ and completely within the casing $s$. The reflector $a$ is supported pivotally upon an axle $t$ in the instrument head $u$ which is adapted to turn in the manner above described. The reflector $a$ is moved about the axle $t$ by turning the drum $w$ which is displaceable with regard to the fixed part $v$ of the telescope and is provided on its surface with a groove running helically entirely around it, said groove in its entire length representing the path employed for the graduations. This groove serves to guide a pointer $z$ adapted to slide on a rod $y$, the position of which pointer gives the value of the angle made with the horizontal plane measured by turning the receiving reflector.

In the form shown in Figs. 1 and 2 the drum $w$ on being moved raises or lowers according to the direction of rotation the ring 2 which is directly connected with it. This movement is then performed also by the receiving reflector $a$ which during its horizontal rotation slides with a nose 3 continuously on the ring 2. The uniform pressure of the nose 3 on the ring 2 can be assured in case of need by means of a spring 4 which presses the pin 5 against the back vertical surface of the reflector - mount. A similar effect is obtained by the arrangement shown in Fig. 9. In this arrangement the nose 3 is rigidly connected by means of a bolt 12 with the ring $2^1$ which is arranged revolubly with regard to the ring 2 attached to the drum $w$.

In order still further to improve the fineness with which the parts can be adjusted, which is desirable for many instruments, an additional drum (13 as shown in Fig. 10) may be inserted between the drum $w$ and the reflector $a$. The drum 13 is then prevented from rotating and is provided on its outer periphery with a thread running in the opposite sense to the thread on the drum $w$ and having a different pitch from that of said latter thread. In this manner only the difference between the motions of the two drums is transmitted to the reflector $a$, whereby in consequence of the increased length of the path to be measured the same can be more finely graduated.

If, as already mentioned above, the second reflector $c$ lies behind the reflector $d$, the mechanism can be simplified by rotating both reflectors $a$, $c$ by means of a common screw 6. This case is shown in Figs. 4 to 6. In order also in this case to prevent delicate parts from projecting out, the worm or endless screw 6 is placed as near to the central axis of the instrument as possible. In order to enable it to be actuated the worm or endless screw 6 is provided with suitably constructed means for turning it by hand.

In the forms shown in Figs. 5 and 6 the endless screw 6 is rotated directly by means of milled heads 7 and 8 mounted on the same spindle. For instruments which are exposed to rough treatment, as for example, telescope-sights on cannon, the arrangement shown in Fig. 5 is to be recommended, as in this case the head 7 is protected by the edge of the casing which spans it round. For this head 7 a key 14 (see Fig. 8) might be substituted, which could be placed on a square 15 on the spindle of the endless screw 6 and be removed when not in use. In Fig. 5 a disk 10 is provided for reading off the angle, said disk rotating with the screw 6 and being furnished with a scale, while on the casing a mark is provided. In order to enable the adjustments to be made with exactness, the endless screw 6 can be driven by means corresponding to those represented in Figs. 1 to 3, namely, by means of a milled sleeve $r$ provided with an internal thread and by means of worm wheels.

If the instrument is intended to be of the binocular type, an arrangement of prisms 11 somewhat as shown in Fig. 7 may be employed.

What I claim as my invention and desire to secure by Letters Patent, is:—

1. A telescope of the type described comprising in combination an adjustable receiving reflector, a casing for the same provided with worm-wheel teeth, an object glass, an adjustable erecting reflector, a casing for the same provided with worm-wheel teeth, a third reflector, an eye-piece, and means for adjusting the receiving reflector and erecting reflector comprising endless screws engaging with the worm-wheel teeth on the reflector casings.

2. A telescope of the type described comprising in combination an adjustable receiving-reflector, an object-glass, an adjustable erecting reflector, a third reflector, an eye-piece, a casing inclosing said parts, a sleeve concentrically arranged round said casing and provided internally with a thread and externally with a milled edge, a plurality of worm-wheels engaging with said thread, and means transmitting motion from said worm-wheels to said adjustable reflectors.

3. A telescope of the type described comprising in combination an adjustable receiving-reflector, a worm-wheel connected with said receiving-reflector, an object glass, an adjustable erecting-reflector, a worm-wheel rigidly connected with said erecting-reflector, a third reflector, an eye-piece, a casing inclosing said parts, a sleeve concentrically arranged round said casing and provided internally with a thread and externally with a milled edge, a plurality of worm-wheels engaging with said thread, a spindle carrying said worm-wheels and provided with a worm, said worm engaging both of the first-mentioned worm-wheels connected with the receiving-reflector and erecting-reflector respectively.

4. A telescope of the type described comprising in combination a receiving-reflector revoluble about both a vertical and horizontal axis, an object-glass, a revoluble erecting-reflector, a third reflector, an eye-piece, means for revolving the erecting-reflector, means for revolving the receiving-reflector about its vertical axis of revolution, and means for adjusting it about its horizontal axis of revolution, said latter means comprising one of the fixed parts of the telescope provided with a thread, a vertical drum surrounding said fixed part and provided with an internal thread engaging the former thread and also provided with an external graduated helical groove, means transmitting the upward motion of said drum when rotated by hand to the receiving-reflector, and a vertically displaceable pointer engaging in said helical groove, and means for preventing said pointer from rotating.

5. A telescope of the type described comprising in combination a receiving-reflector revoluble about both a vertical and horizontal axis, an object-glass, a revoluble erecting-reflector, a third reflector, an eye-piece, means for revolving the erecting-reflector, means for revolving the receiving-reflector about its vertical axis of revolution, and means for adjusting it about its horizontal axis of revolution, said latter means comprising one of the fixed parts of the telescope provided with a thread, a vertical drum surrounding said fixed part and provided with an internal thread engaging with the former thread and also provided with an external graduated helical groove, means transmitting the upward motion of said drum when rotated by hand to the receiving-reflector, and a vertically displaceable pointer engaging in said helical groove, and means for preventing said pointer from rotating, and a spring acting on the receiving-reflector and opposing its displacement by the means for adjusting it about a horizontal axis.

6. A telescope of the type described comprising in combination a receiving-reflector, a horizontal member on which said reflector is revoluble about a horizontal axis, a member revoluble about a vertical axis, carrying said horizontal member, a revoluble erecting-reflector, a third reflector, an eye-piece, means for revolving the erecting-reflector, means for revolving the member carrying the horizontal member, and means for adjusting the receiving-reflector about the horizontal member, said latter means comprising one of the fixed parts of the telescope provided with a thread, a vertical drum surrounding said fixed part and provided with an internal thread engaging the former thread, a ring revoluble about a vertical axis and mounted on and engaging with the top of said drum, and means rigidly connecting said ring with the receiving-reflector.

7. A telescope of the type described comprising in combination a receiving-reflector revoluble about both a vertical and horizontal axis, an object-glass, a revoluble erecting-reflector, a third reflector, an eye-piece, means for revolving the erecting-reflector, means for revolving the receiving-reflector about its vertical axis of revolution, and means for adjusting it about its horizontal axis of revolution, said latter means comprising one of the fixed parts of the telescope provided with a thread, a vertical drum surrounding said fixed part and provided with an internal thread engaging the former thread and with a second thread, a second vertically displaceable but non-revoluble drum having a thread engaging with the second thread on the first drum, and means transmitting the upward motion of said second drum when the first drum is rotated by hand to the receiving-reflector.

In testimony whereof I have signed my name to this specification in the presence of the two subscribing witnesses.

ARWED HAHN.

Witnesses:
HERMANN LÜSSEBRANDT,
RUT. HÜTSER.